United States Patent
Choi

(10) Patent No.: US 7,254,422 B2
(45) Date of Patent: Aug. 7, 2007

(54) ANTENNA-HEADSET COMBINATION FOR A MOBILE TERMINAL

(75) Inventor: Tae-Kyu Choi, Anyang (KR)

(73) Assignee: LG Electronics Inc., Seoul (KR)

( * ) Notice: Subject to any disclaimer, the term of this patent is extended or adjusted under 35 U.S.C. 154(b) by 192 days.

(21) Appl. No.: 10/322,204

(22) Filed: Dec. 17, 2002

(65) Prior Publication Data
US 2004/0204198 A1    Oct. 14, 2004

(30) Foreign Application Priority Data
Apr. 13, 2002    (KR) .................. 10-2002-0020245

(51) Int. Cl.
*H04M 1/00*    (2006.01)
(52) U.S. Cl. .................. 455/575.1; 455/90.3; 455/107
(58) Field of Classification Search ............. 455/575.2, 455/575.4, 575.6, 575.7, 550.1, 569.1, 767, 455/702, 700 MS, 575.1, 90.3, 95, 97, 106, 455/107, 111; 379/430, 388.01, 448, 449
See application file for complete search history.

(56) References Cited
U.S. PATENT DOCUMENTS

| | | | | |
|---|---|---|---|---|
| 4,179,590 A | * | 12/1979 | Snow | ..................... 379/430 |
| 5,943,627 A | * | 8/1999 | Kim et al. | ............... 455/569.1 |
| 6,370,257 B1 | * | 4/2002 | Bleim et al. | ................ 381/409 |
| 6,441,789 B1 | * | 8/2002 | Sasano | ....................... 343/702 |
| 2002/0196190 A1 | * | 12/2002 | Lim | ..................... 343/700 MS |
| 2003/0146876 A1 | * | 8/2003 | Greer et al. | ................ 343/702 |

FOREIGN PATENT DOCUMENTS

| | | |
|---|---|---|
| CN | 1306381 A | 8/2001 |
| KR | 00212686 B1 | 5/1999 |
| KR | 20-0180379 | 5/2000 |

* cited by examiner

*Primary Examiner*—Matthew Anderson
*Assistant Examiner*—Tan Trinh
(74) *Attorney, Agent, or Firm*—Lee, Hong, Degerman, Kang & Schmadeka

(57) ABSTRACT

A headset for a mobile communication terminal is disclosed. The headset comprises a main body and a RF module printed circuit board (PCB) housed within it. A microphone is also housed within the main body and connected to the RF module PCB. A guide piece housing an antenna, which is connected to the RF module PCB, is connected to the main body on one end and has an opening on the second end. Finally, a speaker is connected to the main body opposite the guide piece.

21 Claims, 8 Drawing Sheets

ANTENNA-HEADSET COMBINATION FOR A MOBILE TERMINAL

CROSS REFERENCE TO RELATED APPLICATION

Pursuant to 35 U.S.C. § 119(a), this application claims the benefit of earlier filing date and right of priority to the Korean Patent Application No. 2002-20245, filed on Apr. 4, 2002, the content of which is hereby incorporated by reference in its entirety.

BACKGROUND OF THE INVENTION

1. Field of the Invention

The present invention relates to a headset used for a mobile communication terminal and, more particularly, to a compact and portable antenna mounted inside a communication headset.

2. Description of the Background Art

In general, a radio earphone-microphone for a mobile communication terminal, or the like, is connected to the terminal by way of a wire. Korea Patent Application No. 2000-38718, dated Jul. 6, 2000, discloses a conventional radio earphone-microphone that includes a parent device connected to a mobile communication terminal and a child device wirelessly connected to the parent device. A transmission antenna and a reception antenna are installed inside a support bar in the child device.

The transmission and the reception antenna are installed close to the inside of the support bar. The transmission power flows from the transmission antenna to the reception antenna, resulting in performance degradation of the overall system due to interference between the transmission antenna and the reception antenna.

Distortion and performance degradation also occur when a microphone is installed at an end portion of the antenna, because a voice signal generated by the microphone is transmitted as a module by using an electric wire passing around the antenna. This results in reception being deteriorated due to a back current of the signal and interference. Furthermore, due to an impedance change, the antenna may not function properly.

FIG. 1 is a perspective view of a chip design with the antenna installed on a radio frequency (RF) module. Antenna 104 is mounted as an integrated circuit on a printed circuit board (PCB) 102 of a module of a mobile communication terminal. That is, in this structure, a dipole or a helical antenna is mounted on the surface of the PCB 102 by using a dielectric substance having a high dielectric constant. The dielectric constant of the dielectric substance is very high to provide for a very short wavelength and thus, a compact terminal. Due to the high dielectric constant, a power loss takes place. Also, the transmission characteristics and the gain of the antenna can be degraded.

FIG. 2 is a perspective view of a print-type monopole antenna installed on a PCB module of a mobile communication terminal. A monopole antenna 108 printed on the module PCB 106 is inexpensive. However, since a certain distance should be maintained from a ground plane, and since the dielectric constant of the substrate is small, module integration is difficult. Moreover, if the antenna is positioned close to the RF module, it would be susceptible to noise generated from the module. As such, the transmission properties of the antenna are degraded.

SUMMARY OF THE INVENTION

The present invention is directed to an antenna mounted inside a preferably wireless headset for a mobile terminal.

Additional features and advantages of the invention will be set forth in the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an antenna mounted inside a headset for a mobile communication terminal comprises a main body having first and second ends and a RF module printed circuit board (PCB) housed within the main body. A microphone is also housed within the main body and is connected to the RF module PCB. The antenna further comprises a guide piece having first and second ends, wherein the first end is secured to the second end of the main body. An opening is situated on the second end of the guide piece. An antenna is housed within the guide piece and connected to the RF module PCB. Additionally, a speaker is connected to the first end of the main body.

According to one aspect of the present invention, the antenna further comprises a support structure that rests against a user's face to maintain a certain distance between the guide piece and the user's face when the headset is worn by the user. The speaker is sized to fit the human ear.

According to one aspect of the invention, the guide piece may be hollow and cylindrical in shape configured to house the antenna. Also, the guide piece may be elongated or telescopic in construction so that the opening may be extended to the user's mouth when the headset is worn by the user. The guide piece may be connected to the RF module PCB to form a power feed. Finally, the guide piece may be made of flexible material or a portion of the guide piece may be corrugated to conform to moving in multiple directions.

According to another aspect of the present invention, the antenna may have a monolithic construction and may be of a monopole-type. Also, the antenna may comprise a first antenna, which is at least partially cylindrical in shape and mounted on the RF module PCB, and one or more second antenna parts, which are at least partially cylindrical in shape and connected to the first antenna part by a coaxial cable.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments. Reference will now be made in detail to one or more embodiments of the invention, examples of which are illustrated in the accompanying drawings.

DETAILED DESCRIPTION OF THE PREFERRED EMBODIMENTS

Figure 1:
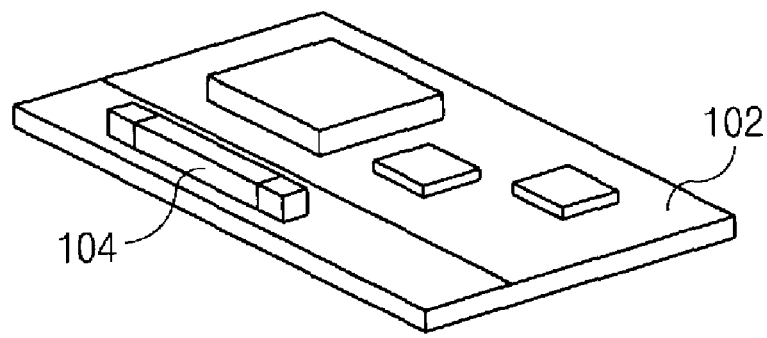
FIG. 1 is a perspective view of an antenna installed in an RF module.
Figure 2:
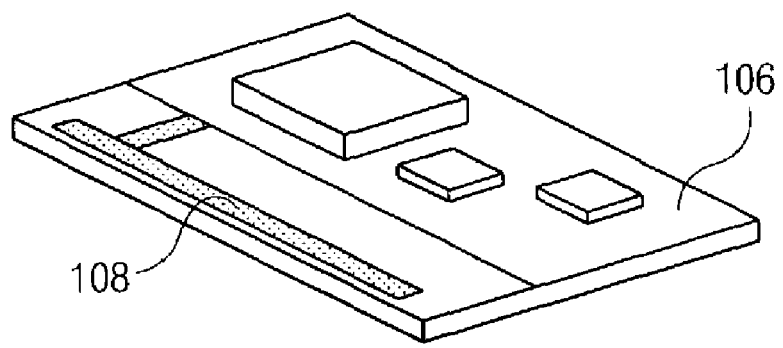
FIG. 2 is a perspective view of another embodiment of an antenna installed in an RF module.
Figure 3:
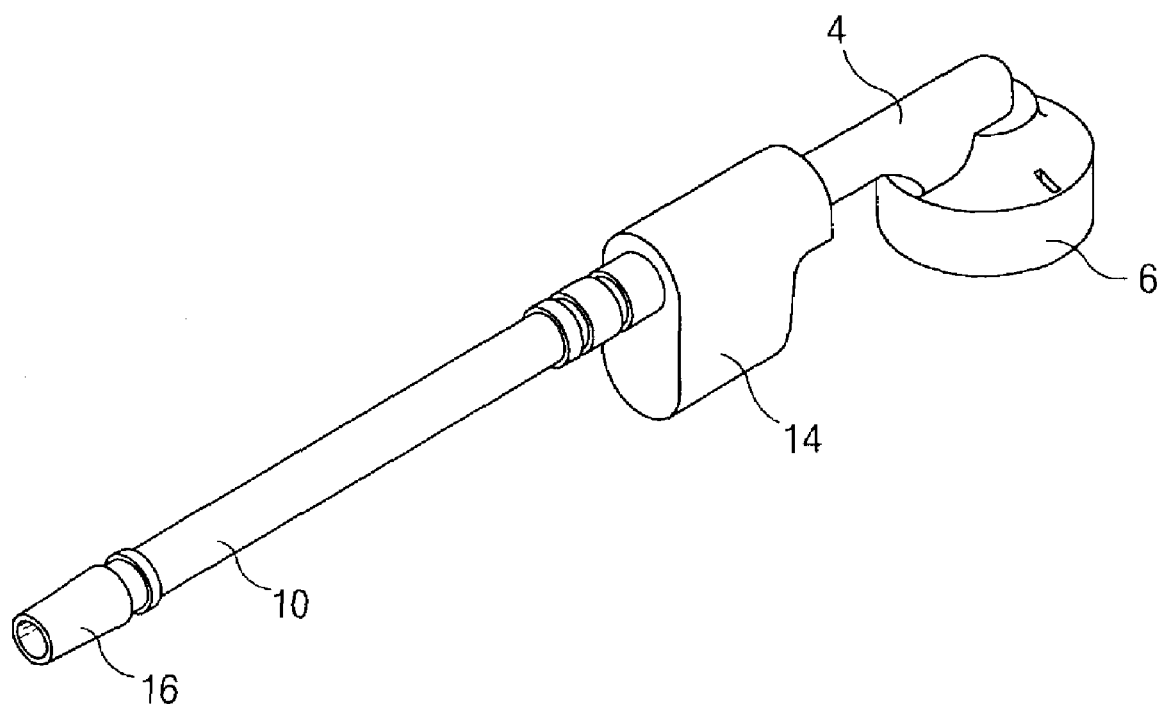
FIG. 3 is a perspective view of a wireless headset for a mobile communication terminal with an antenna installed therein, in accordance with one embodiment of the invention.
Figure 4:
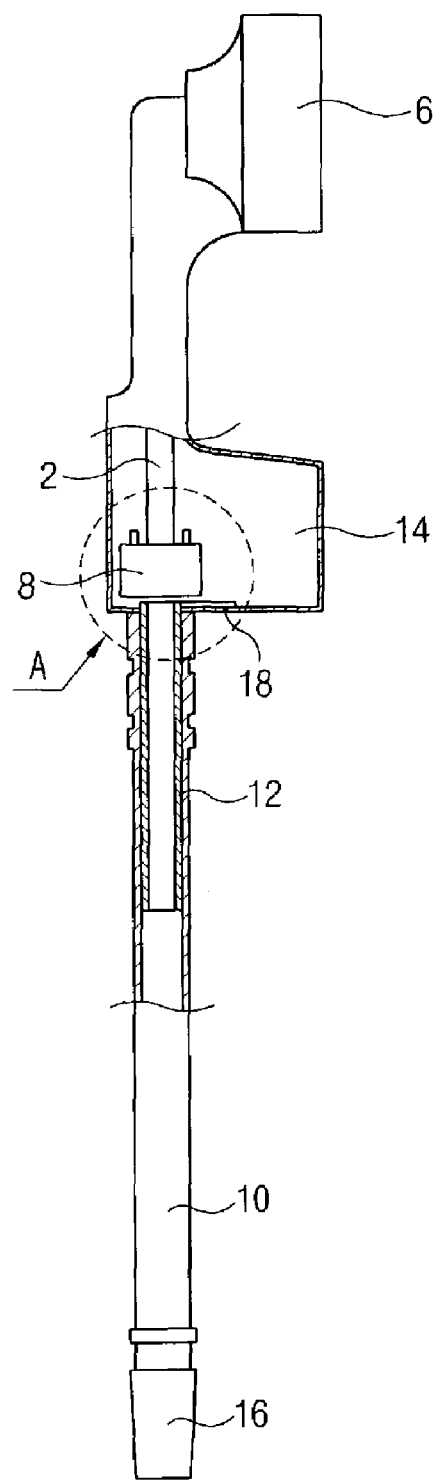
FIG. 4 is a partial cross-sectional view of the wireless headset of FIG. 3.

Referring to FIGS. 3-4, a radio earphone-microphone headset in accordance with one embodiment of the present invention comprises a main body 4 having an RF module printed circuit board (PCB) 2; a speaker 6 installed at one end of the main body 4; a microphone 8 installed at the other end of the main body 4 enclosed in a support 14; a guide pipe 10 downwardly extended from the support 14 for guiding sound to the microphone 8; and an antenna 12 installed inside the guide pipe 10 and connected to the PCB 2.

The main body 4 includes sufficient space for mounting the RF module PCB 2 therein. The speaker 6 is sized so as to fit in the human ear. A support 14 houses microphone 8 and is designed to rest against human face so as to provide a distance between the face and the headset when worn.

The guide pipe 10 is preferably cylindrical in shape and is hollow so as to serve as a passage to transmit the voice of a user to the microphone 8. The guide pipe 10 is sufficiently long to extend within the proximity of the user's mouth when the headset is worn by the user. In one embodiment, the guide pipe 10 has a telescopic construction and can be extended to a desired position, so that opening 16 located at the terminal portion of guide pipe 10 can be positioned with the proximity of the user's mouth.

Figure 5:
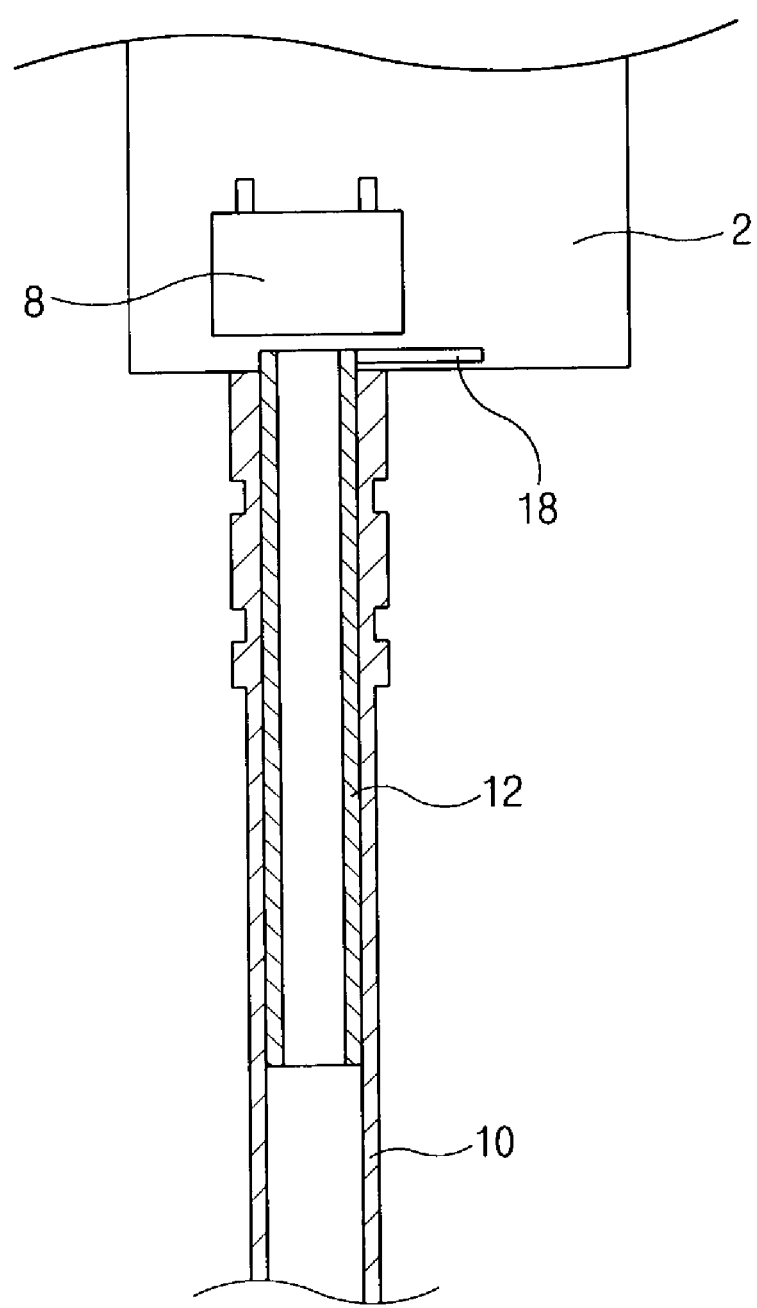
FIG. 5 is a cross-sectional view of an antenna installation structure in accordance with an embodiment of the invention.
Figure 6:
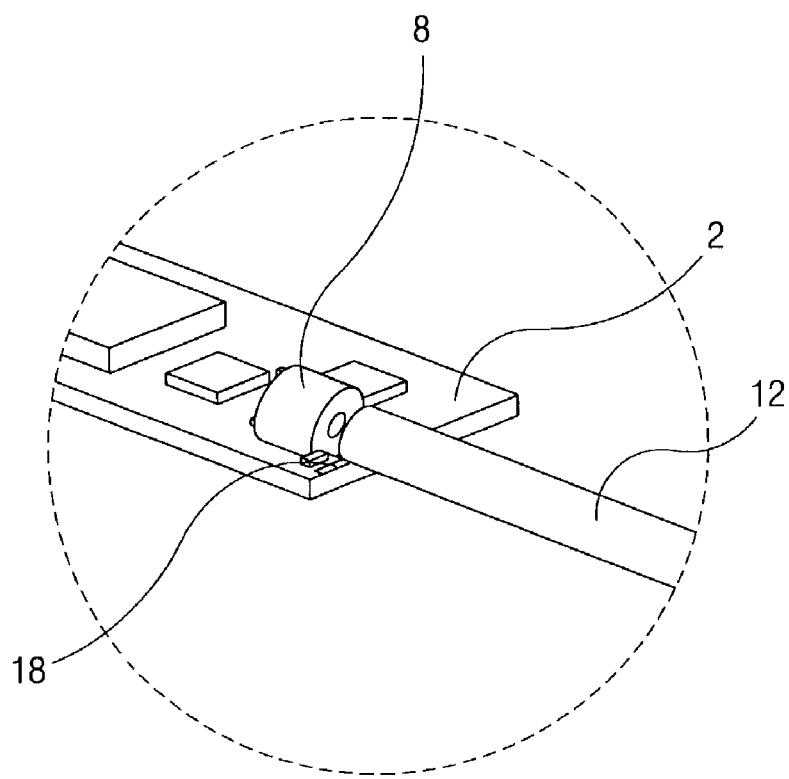
FIG. 6 is an enlarged cross-sectional view of circled portion 'A' of FIG. 4, showing the antenna installation structure in accordance with an embodiment of the invention.

Referring to FIGS. 5 and 6, the antenna 12 is preferably cylindrical in shape for insertion into the hollow space provided in the guide pipe 10. One end of the guide pipe 10 is mounted on the RF module PCB 2 to form a power feed 18. The power feed point 18 is positioned close to the microphone 8, so that antenna 12 can be easily installed by being directly mounted on the RF module PCB 2.

The dimensions of the antenna 12 are configured to minimize interference with a voice signal passing the guide pipe 10. Antenna 12 is monolithic in accordance with one or more embodiments of the invention and is preferably of a monopole type. Maximum current distribution for the antenna 12 is at the power feed point 18. Current distribution diminishes toward the terminal point of the antenna as the current flows further away from power feed point 18.

Figure 7:
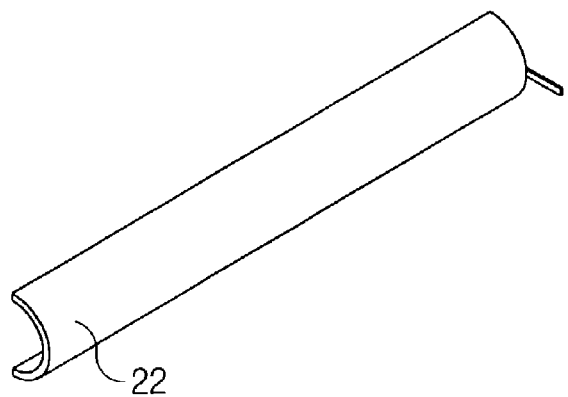
FIG. 7 is a perspective view of an antenna in accordance with another embodiment of the invention.

Referring to FIG. 7, an antenna 22 in accordance with a second embodiment of the invention has a partially cylindrical shape. Antenna 22 may be fully or partially inserted into the hollow portion of the guide pipe 10 in a manner that it would not interfere with flow of voice signals passing through guide pipe 10 as much as possible.

Figure 8:
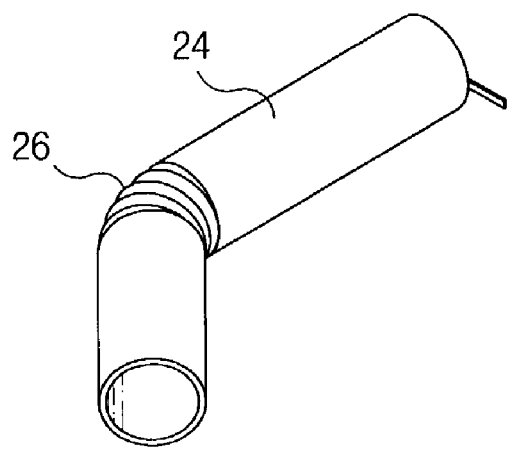
FIGS. 8-12 are perspective views of the antenna in accordance with one or more embodiments of the invention.

Referring to FIG. 8, an antenna 24 in accordance with another embodiment of the present invention is inserted into an adjustable guide 10, so that when the guide pipe 10 is bent, the antenna can also change shape accordingly. Namely, a corrugated portion 26 is provided at a portion of the antenna 24 so that when the guide pipe 10 is bent from side to side the antenna can change shape accordingly.

Figure 9:
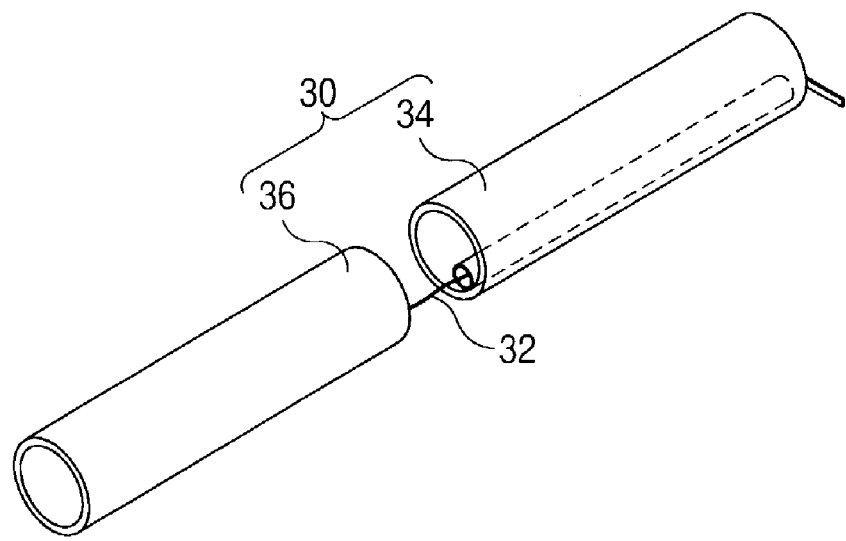

Referring to FIG. 9, an antenna 30, in accordance with another embodiment of the invention comprises: a first antenna member 34 in preferably a cylindrical form mounted on the RF module PCB 2, and a second antenna member 36 in preferably cylindrical form connected to the first antenna member 34 by, for example, a coaxial cable 32. A power feed is provided between the first antenna member 34 and the second antenna member 36. Antenna 30, in accordance with one embodiment, is a monopole-type antenna divided into two parts. The monopole-type antenna 30 has same radiation characteristics and gain of a dipole-type antenna, but has a simpler power feed method than that of the dipole type antenna.

Current distribution of the antenna 30 is such that the current is maximized at a portion where the first antenna member 34 and the second antenna member 36 are connected. Current distribution diminishes toward the distal ends of the first and second antenna members 34 and 36. In certain embodiments, the monopole-type antenna 30 may be divided into more than two parts, that are connected by the coaxial cable 32.

Figure 10:
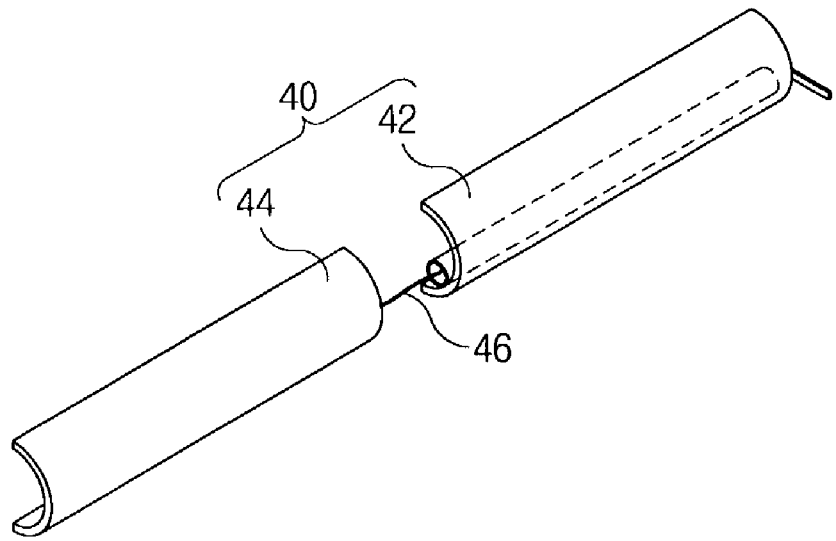

Referring to FIG. 10, an antenna 40, in accordance with another embodiment of the present invention comprises: a partially cylindrical first antenna member 42 mounted on the RF module PCB, and a second partially cylindrical antenna member 44 connected to the first antenna member 42 by a coaxial cable 46.

Figure 11:
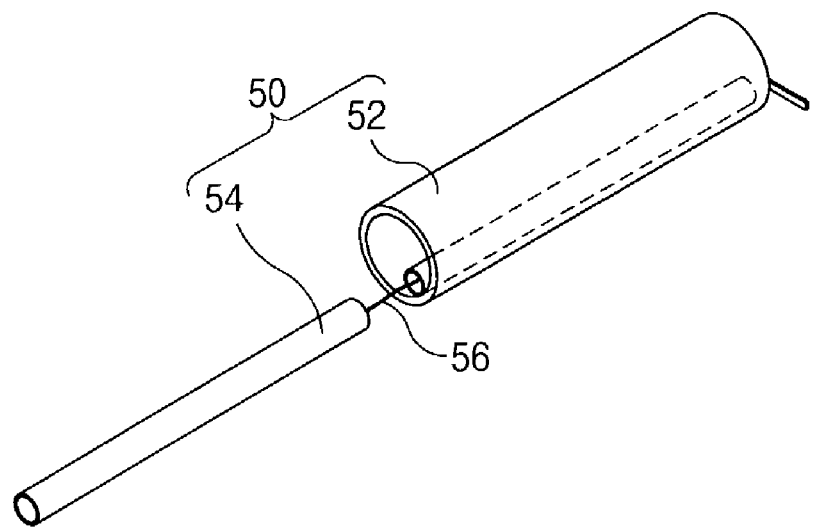

Referring to FIG. 11, an antenna 50 in accordance with another embodiment of the invention comprises: a hollow cylindrical antenna member 52 mounted on the RF module PCB, and an elongated second cylindrical antenna member 54 connected to the first antenna member 52 by a coaxial cable 56. In some embodiments, antenna member 54 has a smaller diameter than the antenna member 52. A power feed is provided between the first antenna member 52 and the second antenna member 54.

Figure 12:
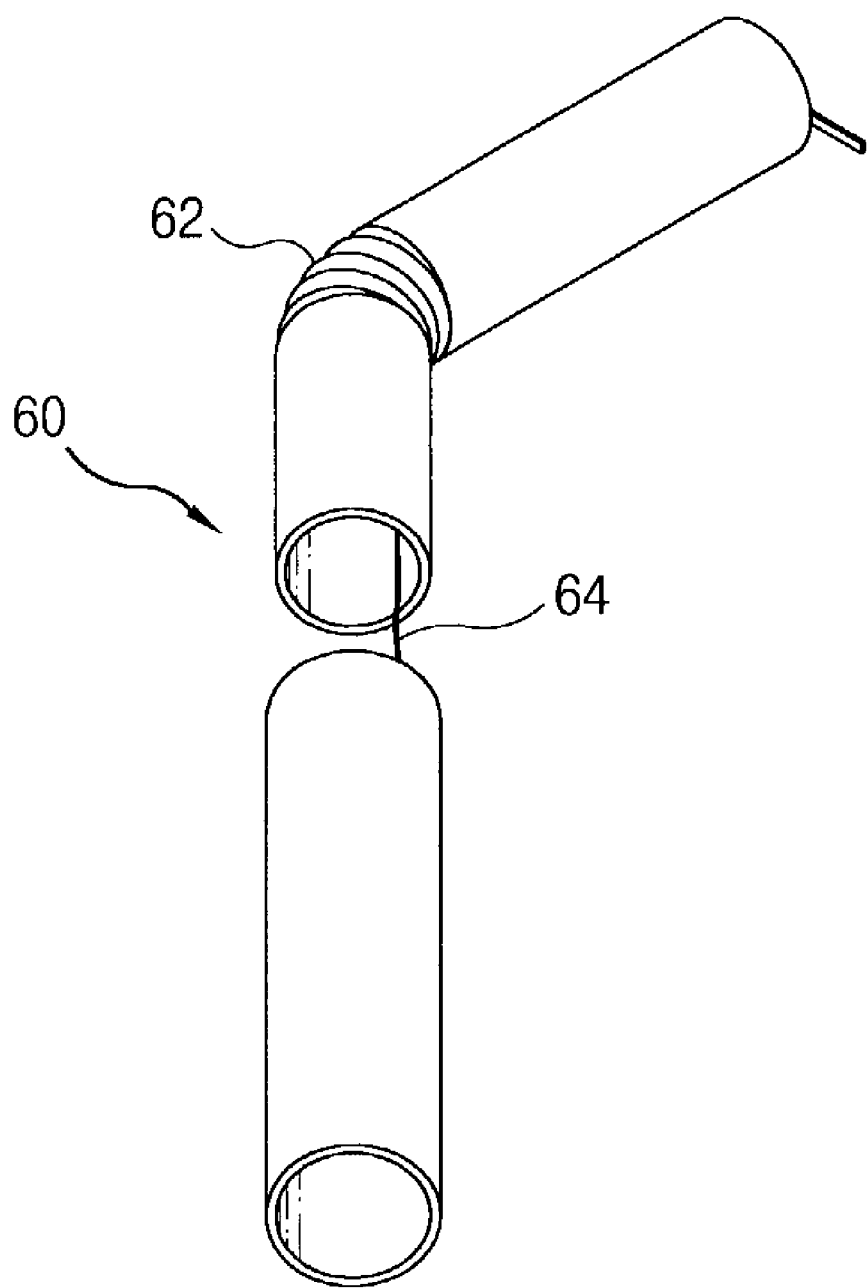

Referring to FIG. 12, an antenna 60 in accordance to another embodiment of the invention may be divided into more than two sections connected by a coaxial cable 64. A first section has a corrugated portion 62, as shown. In accordance with one aspect of the invention, an end portion of the antenna is mounted on the RF module PCB for a power feed.

As such, an antenna for a wireless communication device, in accordance with one or more embodiments, is provided. The reception and transmission efficiency of the antenna is improved due to the provided design.

Although particular embodiments of the invention have been illustrated and described, it will be apparent to those skilled in the art that changes and modifications may be made without departing from the invention in its broader aspects, and therefore, the appended claims are to encompass within their scope all changes, modifications and equivalents that fall within the true scope of the invention.

What is claimed is:

1. A headset for a mobile communication terminal comprising:
    a main body having first and second ends;
    a RF module printed circuit board (PCB) housed within the main body;
    a speaker connected to the first end of the main body;
    a microphone housed within the main body and connected to the RF module PCB;

a guide piece having first and second ends, wherein the first end is secured to the second end of the main body;

an opening situated on the second end of the guide piece; and an antenna housed within the guide piece and connected to the RF module PCB, wherein the antenna is mounted on the RF module PCB for a power feed such that the current distribution though the antenna diminishes toward the terminal end of the antenna as the current flows further way from the power feed point.

2. The headset of claim 1, wherein the speaker is sized to fit in the human ear.

3. The headset of claim 1, further comprising a support structure that rests against a user's face to maintain a certain distance between the guide piece and the user's face when the headset is worn by the user.

4. The headset of claim 1, wherein the guide piece is a hollow cylinder.

5. The headset of claim 4, wherein the guide piece is elongated so that the opening of the guide piece extends proximate to the user's mouth when the headset is worn by the user.

6. The headset of claim 4, wherein the guide piece has a telescopic construction for extending the opening of the guide piece to the user's mouth when the headset is worn by the user.

7. The headset of claim 1, wherein the antenna is cylindrical in shape.

8. The headset of claim 1, wherein the guide piece is connected to the RF module PCB, forming a power feed.

9. The headset of claim 1, wherein the antenna has a monolithic construction.

10. The headset of claim 1, wherein the antenna is of a monopole-type.

11. The headset of claim 1, wherein the antenna is partially cylindrical in shape.

12. The headset of claim 11, wherein the antenna is fully housed within the guide piece.

13. The headset of claim 11, wherein the antenna is partially housed within the guide piece.

14. The headset of claim 11, wherein the guide piece is made of flexible material to conform to moving in multiple directions.

15. The headset of claim 1, wherein a portion of the guide piece is corrugated in order to conform to movement in multiple directions.

16. The headset of claim 1, wherein the antenna comprises:

a first antenna at least partially cylindrical in shape and mounted on the RF module PCB; and one or more second antenna parts, at least partially cylindrical in shape and connected to the first antenna part by a coaxial cable.

17. The headset of claim 16, wherein the antenna is of a monopole-type.

18. The headset of claim 1, wherein the antenna comprises:

a first antenna part cylindrical in shape and mounted on the RF module PCB; and a second antenna part cylindrical in shape and connected to the first antenna part by a coaxial cable, the second antenna part having a smaller diameter than the first antenna part.

19. The headset of claim 1, wherein the antenna comprises:

a first antenna part in shape of a hollow cylinder and mounted on the RF module PCB; and a second antenna part that has monolithic construction and connected to the first antenna part by a coaxial cable.

20. The headset of claim 1, wherein the antenna comprises:

a first antenna part that is hollow and cylindrical in shape and mounted on the RF module PCB, wherein the first antenna part has a corrugated portion that corresponds to longitudinal and lateral transformations of the guide piece; and a second antenna part that is a hollow cylinder and connected to the first antenna part by a coaxial cable.

21. A wireless headset for a mobile communication terminal comprising:

a main body having first and second ends;

a RF module printed circuit board (PCB) housed within the main body;

a speaker, sized to fit in the human ear, connected to the first end of the main body;

a microphone housed within the main body and connected to the RF module PCB;

an elongated guide piece having first and second ends, wherein the first end is secured to the second end of the main body;

an opening situated on the second end of the guide piece extends proximate to the user's mouth when the headset is worn by the user;

the guide piece is connected to the RF module PCB, forming a power feed; and the guide piece is made of flexible material to conform to moving in multiple directions;

a monopole-type antenna housed within the guide piece and comprising a first antenna at least partially cylindrical in shape and mounted on the RF module PCB; and one or more second antenna parts, at least partially cylindrical in shape and connected to the first antenna part by a coaxial cable.

* * * * *